United States Patent
Chaudhri et al.

(10) Patent No.: US 11,523,055 B1
(45) Date of Patent: Dec. 6, 2022

(54) SUPER RESOLUTION/SUPER FIELD OF VIEW (FOV) DIGITAL PHOTOGRAPHY

(71) Applicant: Humane, Inc., San Francisco, CA (US)

(72) Inventors: Imran A. Chaudhri, San Francisco, CA (US); Ralph Brunner, Los Gatos, CA (US); Monique Relova, South San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/334,623

(22) Filed: May 28, 2021

Related U.S. Application Data (60) Provisional application No. 63/032,507, filed on May 29, 2020.

(51) Int. Cl.
*H04N 5/232* (2006.01)
*G06T 3/40* (2006.01)

(52) U.S. Cl.
CPC ....... *H04N 5/23232* (2013.01); *G06T 3/4053* (2013.01)

(58) Field of Classification Search
CPC .......... H04N 5/23232; H04N 5/232133; G06T 3/4053; G06T 3/403; G06T 3/4038; G06T 11/60; G06K 9/146; G06K 9/6211
See application file for complete search history.

(56) References Cited

U.S. PATENT DOCUMENTS

| | | | | |
|---|---|---|---|---|
| 6,184,888 B1 * | 2/2001 | Yuasa | ..................... | G06T 15/10 345/419 |
| 7,327,880 B2 * | 2/2008 | Tek | ..................... | G06V 10/267 382/256 |
| 9,118,883 B2 * | 8/2015 | Wan | ..................... | H04N 5/335 |
| 10,410,321 B2 * | 9/2019 | Ilic | ..................... | H04N 5/2624 |
| 2008/0265130 A1 * | 10/2008 | Colomb | ..................... | G03H 1/0443 250/201.9 |
| 2010/0278422 A1 * | 11/2010 | Iketani | ..................... | H04N 1/4092 382/165 |
| 2011/0019920 A1 * | 1/2011 | Hu | ..................... | G06V 40/10 382/195 |
| 2012/0275654 A1 * | 11/2012 | Fujiki | ..................... | G06T 7/75 382/106 |
| 2017/0034429 A1 * | 2/2017 | Huysegems | ..................... | H04N 5/23216 |
| 2019/0132528 A1 * | 5/2019 | Nashizawa | ..................... | H04N 5/232 |
| 2021/0306550 A1 * | 9/2021 | Hoda | ..................... | H04N 5/23212 |

OTHER PUBLICATIONS

Brown et al., "Automatic panoramic image stitching using invariant features," International Journal of Computer Vision, Aug. 2007, 74(1):59-73.
Brown et al., "Recognising panoramas," Proceedings of Ninth IEEE International Conference on Computer Vision, Oct. 16, 2003, 3:8 pages.

\* cited by examiner

*Primary Examiner* — Hung H Lam
(74) *Attorney, Agent, or Firm* — Fish & Richardson P.C.

(57) ABSTRACT

Techniques are disclosed for creating scaled images with super resolution using neighborhood patches of pixels to provide higher resolution than traditional interpolation techniques. Also disclosed are techniques for creating super field-of-view (FOV) images of a scene created from previously captured and stored images of the scene that are stitched together with a current image of the scene, to generate an image of the scene that extends beyond the fixed FOV of the camera.

33 Claims, 5 Drawing Sheets

SUPER RESOLUTION/SUPER FIELD OF VIEW (FOV) DIGITAL PHOTOGRAPHY

CROSS-REFERENCE TO RELATED APPLICATION

This application claims priority to U.S. Provisional Application No. 63/032,507, filed May 29, 2020, the entire contents of which are incorporated herein by reference.

TECHNICAL FIELD

This disclosure relates generally to digital photography.

BACKGROUND

Modern mobile devices (e.g., smart phones, tablet computers, wearable computers) often include an embedded camera that allows a user to capture digital images or video. A camera application executed on the mobile device allows a user to edit the digital images, such as cropping a portion of a digital image to get a close-up view of an object of interest in the digital image. Cropped images are typically created by digitally scaling a portion of the image, which often generates undesirable artifacts in the enlarged image, such as jagged edges.

Additionally, digital cameras have a limited field-of-view (FOV) that prevents the user from capturing an entire scene in a single shot. Some mobile devices enable a user to take panoramic images. Creating a panoramic image, however, requires the user to take several digital images with slightly overlapping fields of view, and then execute a set of manual steps in an photo editing application to generate the panoramic image by "stitching" together the overlapping digital images.

SUMMARY

Systems, methods, devices and non-transitory, computer-readable storage mediums are disclosed for generating superesolution digital images and super FOVs.

In an embodiment, a method comprises: selecting an image region from a digital image for scaling; for each pixel in the image region: computing a distance measurement between the pixel and pixels in a plurality of neighborhood patches; generating an ordered data structure where a value of the pixel occupies a specified position in the structure; determining a closest matching neighborhood patch based on the distance measurements; and storing values of one or more of the pixels in the closest matching neighborhood patch to other positions in the data structure.

In an embodiment, a method comprises: automatically capturing, using a digital camera having a fixed field of view (FOV), a first digital image of an object at a first time and at a first distance from the object; storing the digital image with a timestamp and FOV direction data; inferring user intent to capture a second digital image of the object at a second location that is closer in distance to the object than the first location; capturing, using the digital camera, the second image of the object at the second location; retrieving, using the timestamp and FOV direction data, the stored first digital image; determining an extended portion of the first digital image that is missing from the second digital image; extracting the extended portion from the first digital image; scaling the extracted, extended portion to the scale of the second image; and stitching the scaled, extended portion to the second image to create a third image that extends beyond the fixed FOV of the digital camera at the second location.

Particular embodiments disclosed herein provide one or more of the following advantages. The super resolution techniques disclosed herein allow the scaling of images with less artifacts than conventional adaptive or non-adaptive interpolation techniques. The super FOV techniques disclosed herein use previously captured images of a scene at different times to automatically generate an image of the scene that extends outside the camera FOV, thereby freeing the user from taking multiple slightly overlapping images and generating panoramic images from the overlapping images using a photo editor.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Wearable Multimedia Device

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet or any other attachment mechanism. The wearable multimedia device includes a digital image capture device (e.g., 120° FOV with optical image stabilizer (OIS)) that allows a user to spontaneously capture multimedia data (e.g., video, audio, depth data) of life events and document transactions with minimal user interaction or device set-up. The multimedia data ("context data") captured by the wireless multimedia device is process locally or uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes). In an embodiment, the device can include photovoltaic surface technology to sustain battery life and inductive charging circuitry (e.g., Qi) to allow for inductive charging on charge mats and wireless over-the-air (OTA) charging.

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures, etc. In an embodiment, the camera direction can be controlled by the head gestures, such that the camera view follows the user's view direction.

In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top. In another embodiment, the wearable multimedia device includes an output port that can connect to a projector or other output device.

In an embodiment, the wearable multimedia device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the wearable multimedia device does not include a hardware display and utilizes the camera and a depth sensor for gesture recognition and control, where the camera can detect and recognize hand and finger poses (e.g., finger pointing direction in 3D space). The camera image is processed using computer vision and/or machine learning models to estimate or predict/classify/annotate 2D bounding boxes of detected objects in the image.

In an embodiment, the image is sent to a network-based server computer that has a machine learning model trained to predict the labels and generate bounding boxes for the objects. An example of a machine learning model that performs instance segmentation is the Mask Regional Convolutional Neural Network (R-CNN). The framework of the Mask R-CNN is based on two stages: first, it scans the image to generate proposals; which are areas with a high likelihood to contain an object. Second, it classifies these proposals and creates bounding boxes and masks. Other instance image segmentation algorithms can also be used.

To protect user and third party privacy, in an embodiment semantic segmentation is first performed on the device to predict object masks but not label the objects. Then only the object data (pixel data within mask) is sent to the server for instance segmentation rather than the entire image frame. In an embodiment, the outbound unlabeled objects and the inbound labeled objects are encrypted before leaving the device or server.

In an embodiment, known 3D object detection deep learning networks, such as PointRNN or VoxelNet can be used to detect and label 3D objects in a point cloud either on the device or on a network-based server computer.

In an embodiment, the wearable multimedia device performs sensor fusion of 3D depth data an 2D image data, where the 3D depth data (e.g., 2D or 3D bounding box coordinates and dimensions) are projected into the 2D image (using extrinsic and intrinsic calibration matrices), so that user gestures can be associated with labeled objects in the 2D image.

Super Resolution Images

Figure 1:
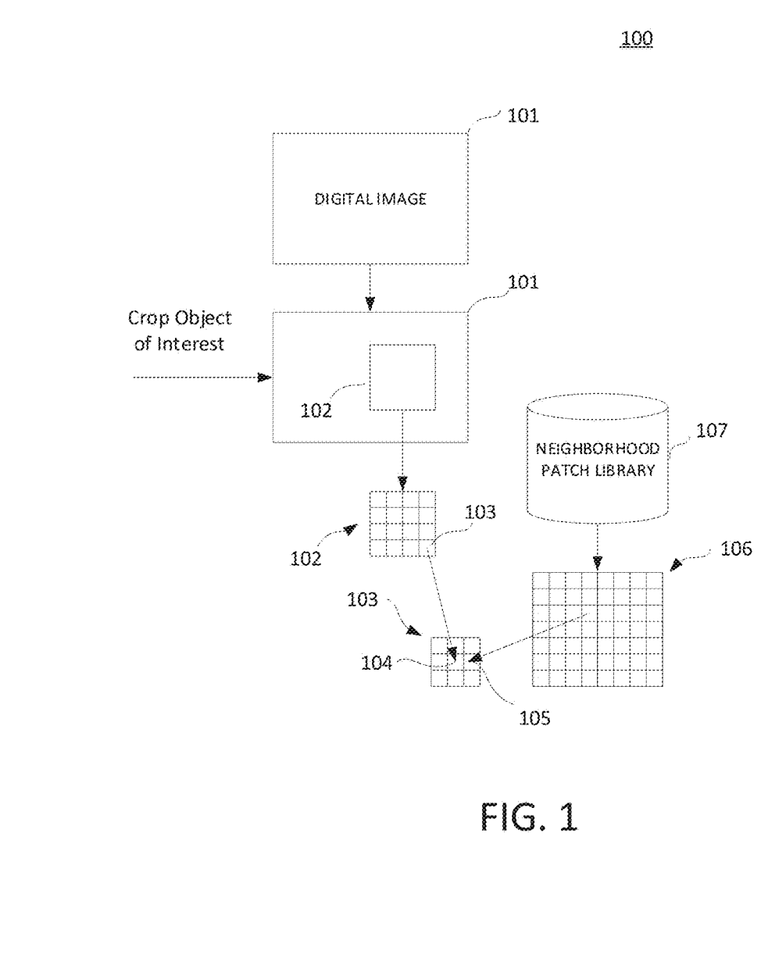
FIG. 1 illustrates a system that generates super resolution images, according to an embodiment.

FIG. 1 illustrates generating super resolution images, according to an embodiment. An object of interest is identified in digital image 101 (e.g., a wide shot image) using any suitable logic, including but not limited to one or more artificial intelligence (AI) algorithms. Image region 102, which includes the object of interest, is selected from digital image 101 for scaling. In an embodiment, objects of interest can be automatically identified for cropping from the image region 102 using image saliency techniques, or using a machine learning model (e.g., a neural network, support vector machine). Each pixel of image region 102 is the center pixel of an N×N ordered data structure 104 that will be used to scale image region 102. In the example shown, data structure is shown as a grid of pixels. In practical applications, however, the pixels may be stored in any suitable data structure, such as a one dimensional or two dimensional array of pixel values (e.g., gray scale integer values). In the example shown, pixel 103 occupies the center position of a 3×3 data structure (i.e., the center of the grid shown) or the center position of a 9 element array. Other size data structures could also be used.

The values of the neighboring pixels (in this example the 8 pixels surrounding center pixel 103) are determined by computing a distance measurement between the center pixel 103 and each of then pixels (e.g., n=31 pixels) in neighborhood patch 106. This step is performed for each neighborhood patch stored in neighborhood patch library 107. In an embodiment, a Euclidean distance measurement is used. Other distance measurements can also be used. Each neighborhood patch in library 107 is processed in a similar manner resulting in a distance metric for each neighborhood patch. The neighborhood patch that has the smallest distance metric (in this example neighborhood patch 106) is selected as the patch that will be used to generate values for the additional pixels surrounding pixel 103 in data structure 104.

In an embodiment, to build the patches library 107, the original high-resolution image, H, is downsampled N times (e.g., by 3X) in two dimensions to create a low-resolution version of the image, L. L is divided into patches, where each patch in the low-resolution image, L, has a center pixel that maps to a center cell of an N×N (e.g., 3×3) block of the high-resolution image, H. The nearest neighbor (e.g., based on Euclidean distance) patch in library 107 to the center cell of an N×N block of a given high-resolution image H, is deemed a match.

Figure 2:
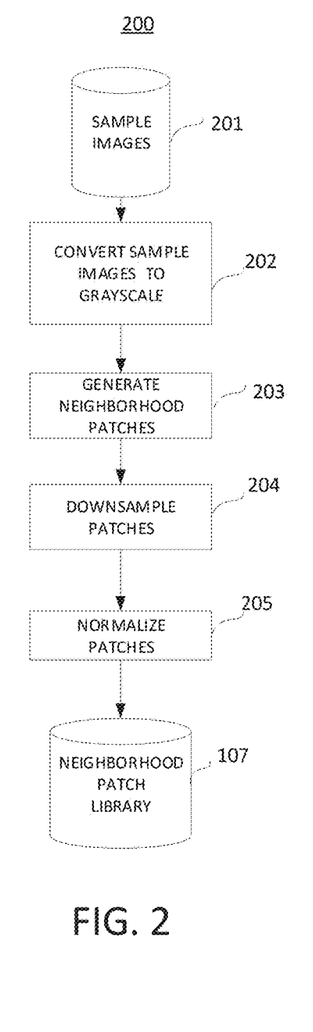
FIG. 2 is a flow diagram of a process of generating pixel neighborhood patches, according to an embodiment.

FIG. 2 is a flow diagram of a process of generating pixel neighborhood patches, according to an embodiment. In an embodiment, neighborhood patches are generated from a corpus of high resolution sample images 201. The sample images 201 are converted to gray scale images 202. From the grayscale images, the neighborhood patches are generated 203. In some embodiments, the patches are entropy encoded to reduce their size before storing in library 207. For example, large areas of a sample image may contain the same shade of gray. For such sample images, entropy encoding will allow the neighborhood patches to be compressed before being stored in library 107. The high resolution neighborhood patches are then down sampled 204, normalized 205 and stored in library 107. In an embodiment, knowledge of the location where the picture was taken and the orientation of the camera FOV (e.g., the orientation of the camera boresight) can be used select a subset of sample images. For example, high resolution images taken of the same object of interest by the user or other users can be selected based on the location and FOV orientation to provide a subset of neighborhood patches. Any suitable filtering or compression process can be used to reduce the size of the library 107.

Figure 3:
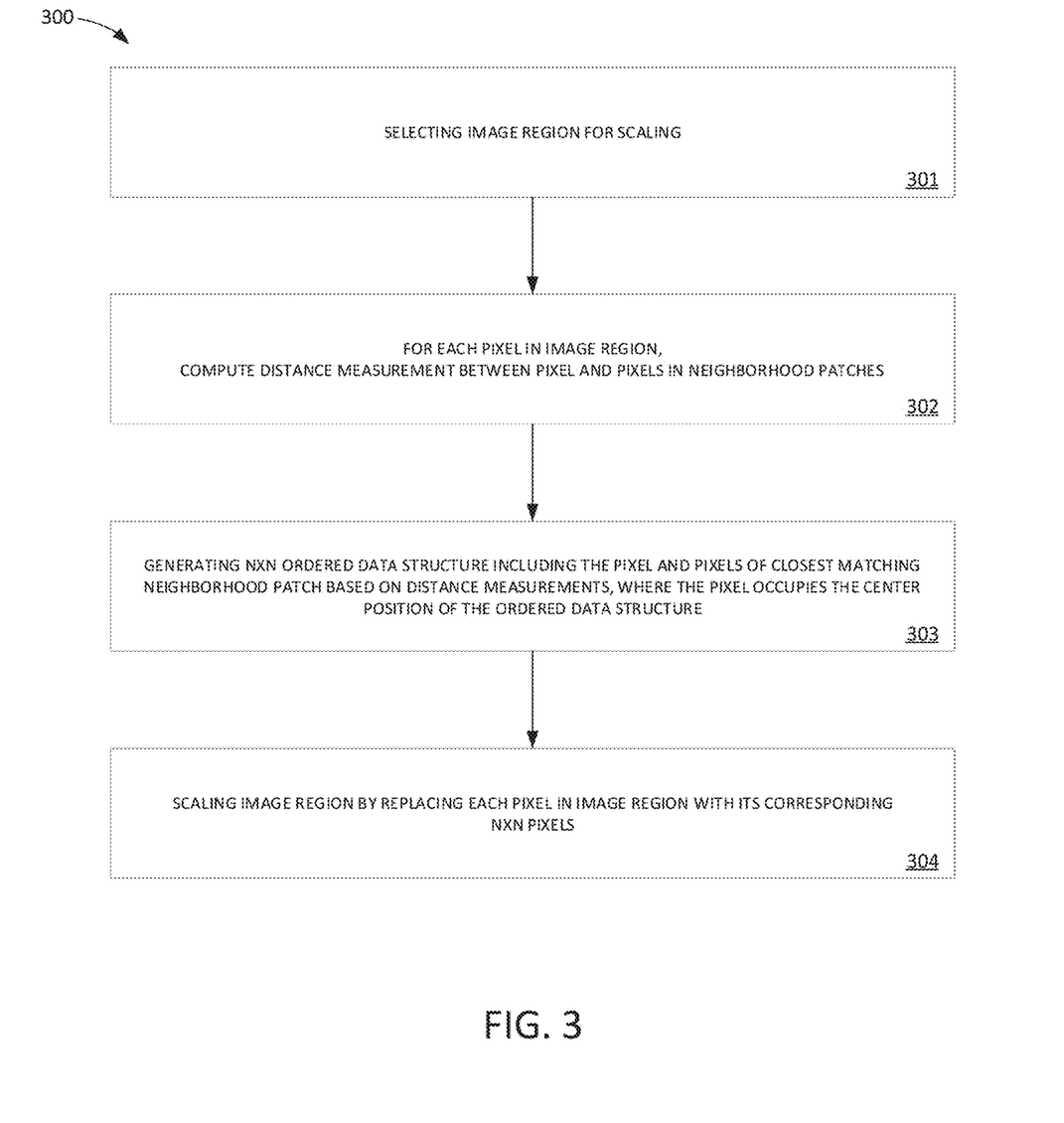
FIG. 3 is a flow diagram of a process of generating super resolution images, according to an embodiment.

FIG. 3 is a flow diagram of a process 300 of generating super resolution images, according to an embodiment. Process 300 can be implemented by the mobile device architecture 600, described in reference to FIG. 6.

Process 300 begins by selecting an image region from a digital image for scaling (301). For each pixel in image region, process 300 computes a distance measurement between the pixel and each of the pixels in a neighborhood patch (302). The neighborhood patch is generated from a corpus of sample images, as described in reference to FIG. 2. In an embodiment, Euclidean distance is used. Other distance metrics can be used (e.g., Chebyshev distance, Manhattan distance, Minkowski distance, etc.)

Process 300 continues by generating an N×N ordered data structure (where the pixel is the center pixel in the ordered data structure) that includes the pixel and pixels of a closest matching neighborhood patch based on the distance measurements (303). In FIG. 1, a conceptual 3×3 pixel grid is shown, but any data structure can be used with any number of pixels. Process 400 continues by scaling the image region by replacing each pixel in the image region with its corresponding N×N ordered data structure (304) when the image region is displayed.

Super FOV

Figure 4:
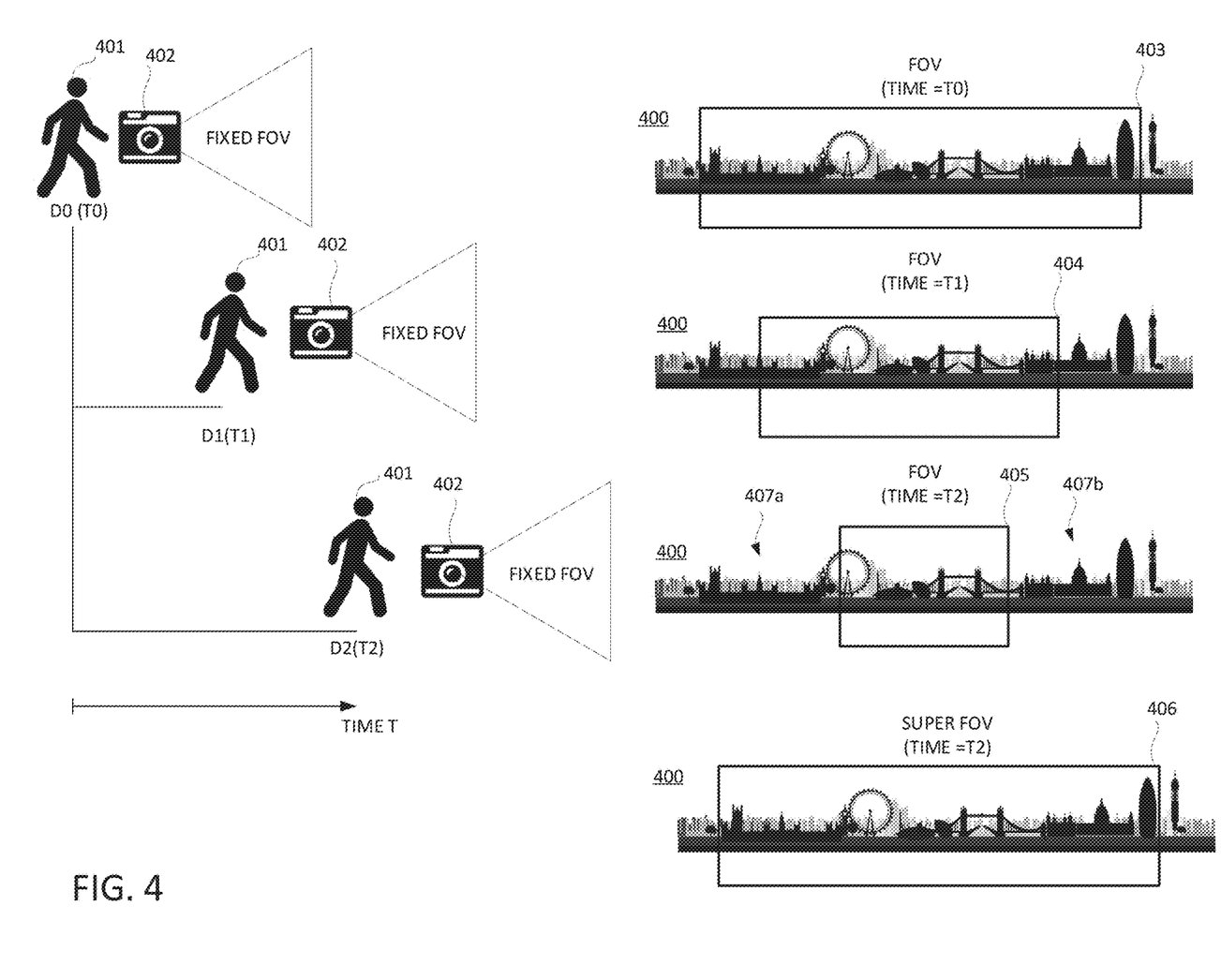
FIG. 4 illustrates a super FOV image, according to an embodiment.

FIG. 4 illustrates a super FOV image, according to an embodiment. In an embodiment, a camera of a wearable device is capable of automatically capturing digital images at different times and storing the timestamped images in memory. Note that the cityscape 400 shown in images 403, 404, 405, 406 are not to scale, and the cityscape 400 would be larger as the user moves closer to cityscape 400.

An inference engine on the device determines the intent of a user wearing the device to capture a particular scene with the camera. The inference can be determined based on context data derived from user input and/or sensor data (e.g., as a speech command or inquiry), the user's location (e.g., determined by a GPS receiver on the device), historical user context data (e.g., the user has recently has recently taken other photographs at the location) and sensor data (e.g., inertial sensors and/or magnetometer to determine the direction of the camera FOV). For example, the user could speak a command, such as "take a picture of this scene." Because the camera FOV is fixed, the captured image may not include the entire scene. To include the entire scene, the previously timestamped images stored in memory are searched to find other images taken in the past that could be used to at least partially extend the current image outside the camera's fixed FOV at the scale that the user desires.

Referring to the example shown in FIG. 4, user 401 is walking to a lookout point where she wants to take a picture of a cityscape 400. She has a wearable multimedia device 402 attached to her clothes that includes an embedded camera with a fixed wide FOV, such that the direction of the camera FOV is in the general direction of the cityscape 400. At time T0 and distanced D0, the camera automatically captures a first image 403 of cityscape 400. At distance D0 and with a fixed wide angle FOV, the first image includes almost the entire cityscape 400. She continues to move toward the lookout point until she gets to distance D1 at time T1. At time T1 and distance D1, the camera automatically captures a second image 404 of cityscape 400. At distance D1 and with a fixed wide angle FOV, the cityscape 400 is closer, resulting in less of the cityscape 400 being captured in the second image 404 than was captured in the first image 403. She continues to walk toward the lookout point until she gets to distance D2 at time T2.

At time T2 and distance D2, the user intends to take a picture from distance D2. For example, the user may say "I want a picture of this!" The inference engine on device 402 uses the user's speech input to infer the user's intent to take a picture at time T2 and the camera is triggered to capture a third image 405 of cityscape 400 at time T2 at distance D2. At distance D2 and with a fixed wide angle FOV, the cityscape 400 appears closer, resulting in less of the cityscape 400 being captured in the third image 405 than was captured in both the first image 403 and the second image 404.

When the user wants to see the image 405, the device 402 automatically retrieves images 402 and 404, determines from images 402, 404 extended portions 407a, 407b of cityscape 400 that were captured in images 402, 403 but not captured in third image 405. The camera selects and extracts the extended portions 407a, 407b of the cityscape 400 from one or both of stored images 402, 403, applies the super resolution techniques previously described to scale the extended portions to the same scale as the third image 405 and then uses known stitching and blending algorithms to seamlessly stich the scaled extended portions to image 405 to generate a super resolution FOV image 406. In an embodiment, the device 402 automatically finds matches between the stored first and second images 402, 403 and the third image 405, and aligns the scaled, extended portions with the third image 405 using blending algorithms to form a seamless super FOV image 406. Some example techniques for matching images and blending are found in, for example, Automatic Panoramic Image Stitching using Invariant Features. M. Brown and D. Lowe. *International Journal of Computer Vision.* 74(1), pages 59-73, 2007, and Recognizing Panoramas. M. Brown and D. G. Lowe. *International Conference on Computer Vision (ICCV*2003), pages 1218-1225, Nice, France, 2003.

Multiple super FOV images can be created in this manner and presented to the user in a contact sheet or other format (e.g., presented on a monitor, laser projection) to allow the user to select from a plurality of super FOV images for persistent storage or transmission to other devices or use by other applications.

Thus, an advantage of the super resolution FOV technique is that the device automatically creates an extended image of a scene at the scale (i.e., composition) that was intended by the user.

In an embodiment, if the direction of the camera is not facing the cityscape 400 at D2 (e.g., the user is facing another person when speaking), the super FOV image can be constructed entirely from stored images of the skyline and presented to the user. If there are no stored images, the inferred user intent to capture an image of the skyline can be stored for future opportunistic execution by the device. For example, as the user walks around the location, the device looks for opportunities to capture images of the cityscape 400 by monitoring the direction of the camera FOV and comparing the direction with a digital map to determine when the camera FOV is facing the cityscape 400. When the device detects that the user is facing the cityscape 400 based on the direction of the FOV and the digital map, the stored inferred user intent triggers the capture of one or more digital images of the cityscape 400, which can be scaled using the super resolution techniques described herein and stitched together into one or more super FOV images using known stitching and blending algorithms.

Figure 5:
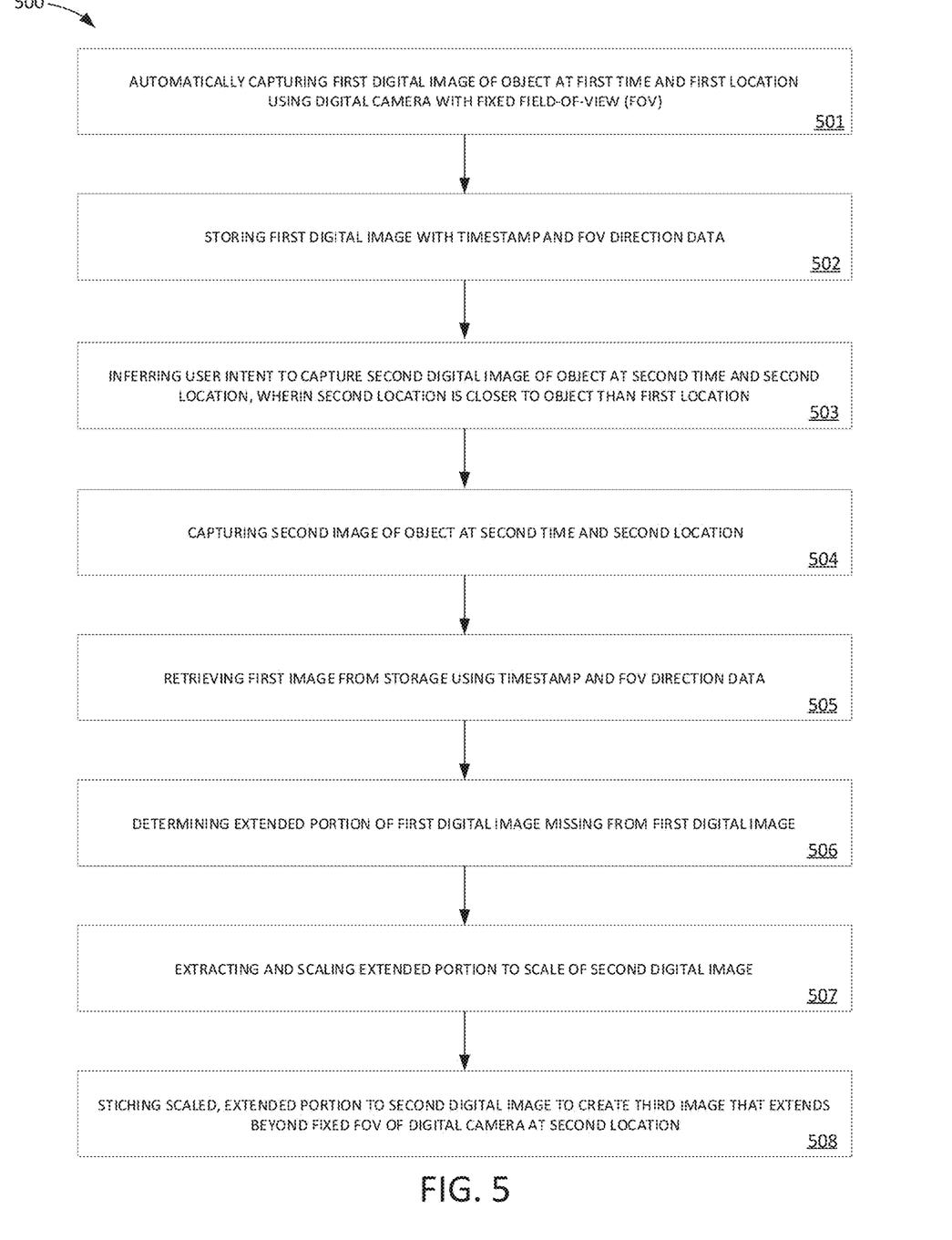
FIG. 5 is a flow diagram of a process of generating super FOV images, according to an embodiment.

FIG. 5 is a flow diagram of a process 500 of generating super FOV images, according to an embodiment. Process 500 can be implemented by the mobile device architecture 600, described in reference to FIG. 6.

Process 500 begins by automatically capturing, using a digital camera having a fixed field of view (FOV), a first digital image of an object at a first time and at a first distance from the object (501), and storing the digital image with a timestamp and FOV direction data (502).

Process 500 continues by inferring user intent to capture a second digital image of the object at a second location that is closer in distance to the object than the first location (503) and capturing, using the digital camera, the second image of the object at the second location (504).

Process 500 continues by retrieving, using the timestamp and FOV direction data, the stored first digital image (505), determining an extended portion of the first digital image that is missing from the second digital image (506), extracting and scaling the extended portion from the first digital image (507); and stitching the scaled, extended portion to the second image to create a third image that extends beyond the fixed FOV of the digital camera at the second location (508).

Other Sensors

In an embodiment, in addition to camera images being stored, if the device includes a depth sensor, such as a time of flight (TOF) sensor, the TOF data can be timestamped and stored. The TOF data can be used by the inference engine as part of the context data to infer the intent of the user. If the user is referencing an object that is not currently in the FOV of the camera or stored in memory, but is in the FOV of the depth sensor, the depth data from the depth sensor (e.g., a point cloud) can be used to determine the object that the user is referencing. The device can include a gesture recognition system that can detect the user's hands in a camera image using TOF data. The gesture recognition system can determine the direction that the user is pointing, and any object in the pointing direction. The gesture data can be timestamped and stored. For example, the user can point to an object with her finger and say "I would like a picture of that." The inference engine would then look at TOF data to determine if the user is pointing at an object and identify the object using, for example, machine learning. The device then monitors for an opportunity to capture a camera image of the identified object as the user walks around the location, as described above.

Example Mobile Device Architecture

Figure 6:
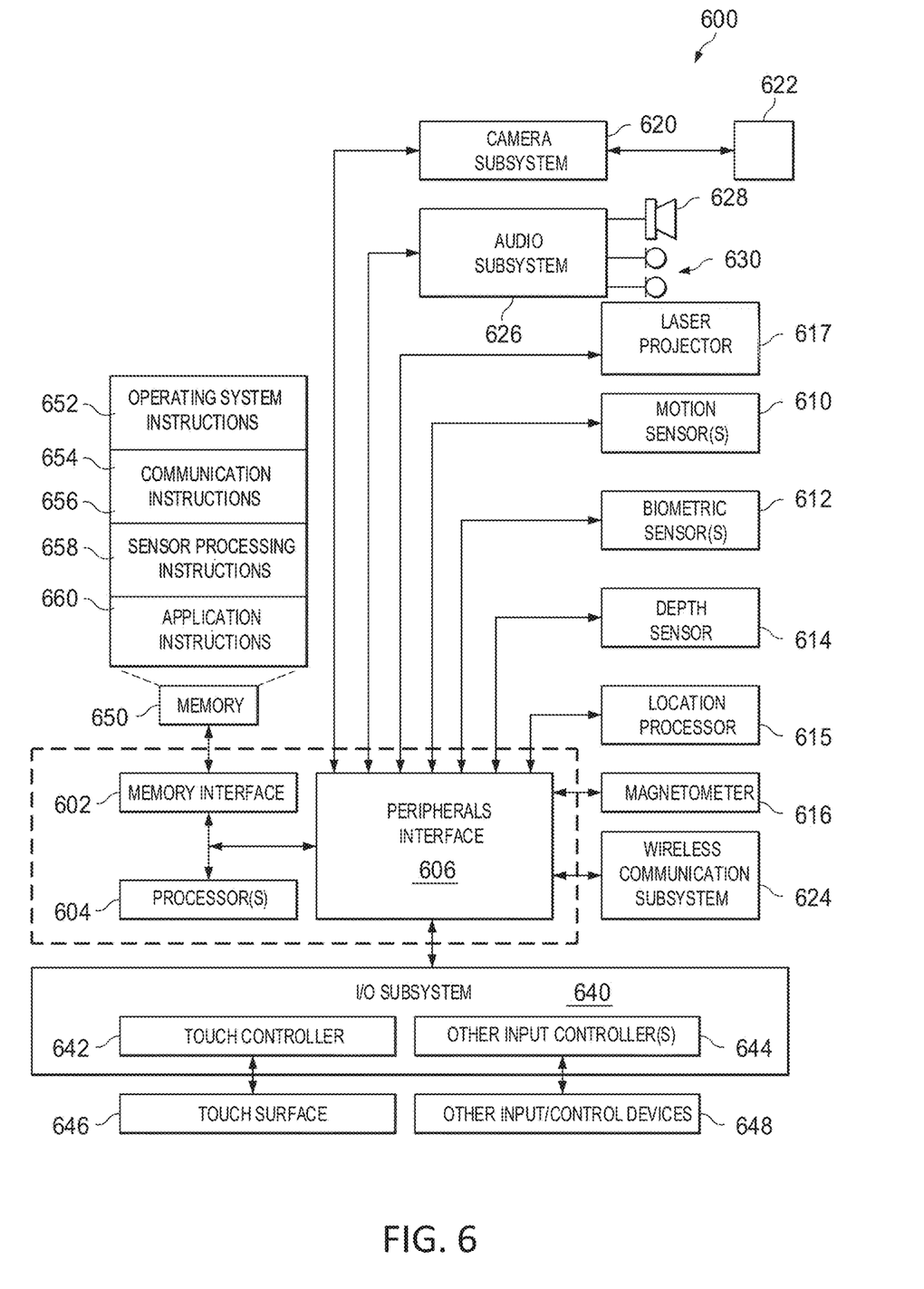
FIG. 6 is an architecture for a mobile device that implements the features and processes described in reference to FIGS. 1-5, according to an embodiment.

FIG. 6 is a block diagram of example architecture 600 for a mobile device implementing the features and processes described in reference to FIGS. 1-5. Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functions. For example, laser projector 617, motion sensor(s) 610, biometric sensor(s) 612, depth sensor 614 may be coupled to peripherals interface 606 to facilitate motion, orientation, biometric and depth detection functions. In some implementations, motion sensor(s) 610 (e.g., an accelerometer, rate gyroscope) may be utilized to detect movement and orientation of the wearable multimedia device.

Other sensors may also be connected to peripherals interface 606, such as environmental sensor(s) (e.g., temperature sensor, barometer, ambient light) to facilitate environment sensing functions. For example, a biometric sensor 512 can detect fingerprints, face recognition, heart rate and other fitness parameters. In an embodiment, a haptic motor (not shown) can be coupled to the peripheral interface, which can provide vibration patterns as haptic feedback to the user.

Location processor 615 (e.g., GNSS receiver chip) may be connected to peripherals interface 606 to provide georeferencing. Electronic magnetometer 616 (e.g., an integrated circuit chip) may also be connected to peripherals interface 606 to provide data that may be used to determine the direction of magnetic North. Thus, electronic magnetometer 616 may be used by an electronic compass application.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. An embodiment, a time-of-flight (TOF) camera can be used resolve distance based on the known speed of light and measuring the time-of-flight of a light signal between the camera and an object/subject for each point of the image.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 624 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 626 may be coupled to a speaker 628 and one or more microphones 630 to facilitate voice-enabled functions, such as voice recognition, voice replication, digital recording, telephony functions and beamforming.

I/O subsystem 640 may include touch controller 642 and/or another input controller(s) 644. Touch controller 642 may be coupled to a touch surface 646. Touch surface 646 and touch controller 642 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 646. In one implementation, touch surface 646 may display virtual or soft buttons, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, device 600 plays back to a user recorded audio and/or video files, such as MP3, AAC, and MPEG video files. In some implementations, device 600 may include the functionality of an MP3 player and may include a pin connector or other port for tethering to other devices. Other input/output and control devices may be used. In an embodiment, device 600 may include an audio processing unit for streaming audio to an accessory device over a direct or indirect communication link.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, iOS, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers, including peer-to-peer communications with wireless accessory devices, as described in reference to FIGS. 1-5. Communication instructions 654 may also be used to select an operational mode or communication medium for use by the device, based on a geographic location of the device.

Memory 650 may include sensor processing instructions 658 to facilitate sensor-related processing and functions and application instructions 660 to facilitate the features and processes described in reference to FIGS. 1-5. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   selecting an image region from a digital image for scaling;
   for each pixel in the image region:
     computing a distance measurement between the pixel and pixels in a plurality of neighborhood patches;
     generating an ordered data structure where a value of the pixel occupies a specified position in the structure;
     determining a closest matching neighborhood patch based on the distance measurements; and
     storing values of one or more of the pixels in the closest matching neighborhood patch to other positions in the data structure.

2. The method of claim 1, wherein selecting an image region from a digital image for scaling further comprising:
   automatically identifying at least one object of interest in the digital image; and
   automatically cropping the image region from the digital image.

3. The method of claim 2, wherein the image region is automatically identified using at least one of saliency techniques or machine learning.

4. The method of claim 2, wherein the ordered structure is an N x N grid of pixels and the specified position is a center pixel in the grid, where N is a positive integer greater than or equal to 3.

5. The method of claim 1, further comprising:
   downsampling a first set of sample images in two dimensions to create a second set of sample images that have lower resolution than the first set of sample images;
   dividing each sample image in the second set of sample images into a plurality of patches of pixels; and
   storing the plurality of patches for use in determining the closest matching neighborhood patch based on the distance measurements.

6. The method of claim 5, further comprising converting the first set of sample images to gray scale prior to downsampling.

7. The method of claim 5, further comprising entropy coding the plurality of patches to reduce their size prior to storing.

8. The method of claim 5, wherein the plurality of patches are normalized prior to storing.

9. The method of claim 1, wherein computing a distance measurement between the pixel and pixels in a plurality of neighborhood patches, further comprises:
   determining a location and orientation of a field of view (FOV) of the digital image; and
   selecting a subset of the plurality of patches for computing the distance measurements based on the location and orientation of the FOV.

10. A method comprising:
automatically capturing, using a digital camera having a fixed field of view (FOV), a first digital image of an object at a first time and at a first location that is a first distance from the object;
storing the first digital image with a timestamp and FOV direction data;
inferring user intent to capture a second digital image of the object at a second location that is closer in distance to the object than the first location;
capturing, using the digital camera, the second image of the object at the second location;
retrieving, using the timestamp and FOV direction data, the stored first digital image;
determining an extended portion of the first digital image that is missing from the second digital image;
extracting the extended portion from the first digital image;
scaling the extracted, extended portion to the scale of the second image; and
stitching the scaled, extended portion to the second image to create a third image that extends beyond the fixed FOV of the digital camera at the second location.

11. The method of claim 10, wherein the FOV direction data includes a location of the digital camera provided by a global navigation satellite receiver and an orientation of a FOV of the digital camera at the location from at least one inertial sensor or a magnetometer embedded in or coupled to the digital camera.

12. The method of claim 10, wherein the user intent to capture a second digital image of the object at a second location that is closer in distance to the object than the first location is inferred based on context data derived from at least one of user input or sensor input.

13. The method of claim 12, wherein the user input is speech input.

14. The method of claim 12, wherein the context data includes locations where the user previously captured a digital image.

15. The method of claim 10, further comprising:
projecting, with a laser projector, the third image on a surface.

16. The method of claim 15, wherein the third image is one of a plurality of images projected on the surface, and the method further comprises:
receiving, with at least one of the digital camera or a three-dimensional sensor, an image of a user's finger performing a gesture in proximity to the projected images;
determining that the gesture indicates the user's intent to select the third image from the plurality of projected images; and
responsive to determining the user's intent to select the third image from the plurality of projected images, performing at least one action related to the third image.

17. A system comprising:
at least one processor;
memory storing instructions that when executed by the at least one processor, cause the at least one processor to perform operations comprising:
selecting an image region from a digital image for scaling;
for each pixel in the image region:
computing a distance measurement between the pixel and pixels in a plurality of neighborhood patches;
generating an ordered data structure where a value of the pixel occupies a specified position in the structure;
determining a closest matching neighborhood patch based on the distance measurements; and
storing values of one or more of the pixels in the closest matching neighborhood patch to other positions in the data structure.

18. The system of claim 17, wherein selecting an image region from a digital image for scaling further comprising:
automatically identifying at least one object of interest in the digital image; and
automatically cropping the image region from the digital image.

19. The system of claim 18, wherein the image region is automatically identified using at least one of saliency techniques or machine learning.

20. The system of claim 18, wherein the ordered structure is an N x N grid of pixels and the specified position is a center pixel in the grid, where N is a positive integer greater than or equal to 3.

21. The system of claim 18, the operations further comprising:
downsampling a first set of sample images in two dimensions to create a second set of sample images that have lower resolution than the first set of sample images;
dividing each sample image in the second set of sample images into a plurality of patches of pixels; and
storing the plurality of patches for use in determining the closest matching neighborhood patch based on the distance measurements.

22. The system of claim 21, the operations further comprising converting the first set of sample images to gray scale prior to downsampling.

23. The system of claim 21, the operations further comprising entropy coding the plurality of patches to reduce their size prior to storing.

24. The system of claim 21, wherein the plurality of patches are normalized prior to storing.

25. The system of claim 18, wherein computing a distance measurement between the pixel and pixels in a plurality of neighborhood patches, further comprises:
determining a location and orientation of a field of view (FOV) of the digital image; and
selecting a subset of the plurality of patches for computing the distance measurements based on the location and orientation of the FOV.

26. The system of claim 17, wherein the system is included in a wearable computing device that is worn on a user's body.

27. A system comprising:
at least one processor;
memory storing instructions that when executed by the at least one processor, cause the at least one processor to perform operations comprising:
automatically capturing, using a digital camera having a fixed field of view (FOV), a first digital image of an object at a first time and at a first location that is a first distance from the object;
storing the first digital image with a timestamp and FOV direction data;
inferring user intent to capture a second digital image of the object at a second location that is closer in distance to the object than the first location;
capturing, using the digital camera, the second image of the object at the second location;

retrieving, using the timestamp and FOV direction data, the stored first digital image;

determining an extended portion of the first digital image that is missing from the second digital image;

extracting the extended portion from the first digital image;

scaling the extracted, extended portion to the scale of the second image; and stitching the scaled, extended portion to the second image to create a third image that extends beyond the fixed FOV of the digital camera at the second location.

28. The system of claim 27, wherein the FOV direction data includes a location of the digital camera provided by a global navigation satellite receiver and an orientation of a FOV of the digital camera at the location from at least one inertial sensor or a magnetometer embedded in or coupled to the digital camera.

29. The system of claim 27, wherein the user intent to capture a second digital image of the object at a second location that is closer in distance to the object than the first location is inferred based on context data derived from at least one of user input or sensor input.

30. The system of claim 29, wherein the user input is speech input.

31. The system of claim 29, wherein the context data includes locations where the user previously captured a digital image.

32. The system of claim 27, further comprising:

projecting, with a laser projector, the third image on a surface.

33. The system of claim 32, wherein the third image is one of a plurality of images projected on the surface, and the system method further comprises:

receiving, with at least one of the digital camera or a three-dimensional sensor, an image of a user's finger performing a gesture in proximity to the projected images;

determining that the gesture indicates the user's intent to select the third image from the plurality of projected images; and responsive to determining the user's intent to select the third image from the plurality of projected images, performing at least one action related to the third image.

* * * * *